United States Patent
Sasaki

(10) Patent No.: US 10,505,785 B2
(45) Date of Patent: Dec. 10, 2019

(54) TERMINAL MONITORING CONTROL DEVICE FOR CONTROLLING AND MONITORING A TERMINAL DEVICE CONNECTED IN A NETWORK

(71) Applicant: Panasonic Intellectual Property Management Co., Ltd., Osaka (JP)

(72) Inventor: Koji Sasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 161 days.

(21) Appl. No.: 15/699,174

(22) Filed: Sep. 8, 2017

(65) Prior Publication Data

US 2018/0077004 A1 Mar. 15, 2018

(30) Foreign Application Priority Data

Sep. 13, 2016 (JP) .................................. 2016-178829
Aug. 30, 2017 (JP) .................................. 2017-164952

(51) Int. Cl.
*H04L 12/24* (2006.01)
*H04L 29/12* (2006.01)
*H04L 12/721* (2013.01)

(52) U.S. Cl.
CPC ............ *H04L 41/046* (2013.01); *H04L 41/12* (2013.01); *H04L 45/70* (2013.01); *H04L 61/103* (2013.01); *H04L 61/6022* (2013.01); *H04L 41/26* (2013.01)

(58) Field of Classification Search
CPC ............. G06F 11/0727; G06F 11/0793; H04L 12/2807; H04L 12/28; H04L 41/0803; (Continued)

(56) References Cited

U.S. PATENT DOCUMENTS

| | | | |
|---|---|---|---|
| 2003/0191836 A1 | 10/2003 | Murtha et al. | |
| 2011/0265006 A1* | 10/2011 | Morimura | G06F 11/0727 715/736 |

(Continued)

FOREIGN PATENT DOCUMENTS

| | | |
|---|---|---|
| JP | 2006-3903 | 1/2006 |
| JP | 2010-191972 | 9/2010 |

(Continued)

OTHER PUBLICATIONS

Japan Business Machine and Information System Industries Association, PJLink Specifications Version 1.04, pp. 1-32, Dec. 10, 2013.

*Primary Examiner* — Le H Luu
(74) *Attorney, Agent, or Firm* — Wenderoth, Lind & Ponack, L.L.P.

(57) ABSTRACT

A terminal monitoring control device that controls a terminal device to be monitored connected to a network, the terminal monitoring control device including: a communication information creator that transmits a first command to the terminal device and receives a response to the first command from the terminal device, and determines whether the terminal device can perform communication based on a received result; an information analyzer that, when a determination result of the communication information creator indicates that the terminal device can perform communication, transmits a second command to the terminal device and receives a response to the second command from the terminal device, and determines based on a received result whether the terminal device can be monitored based on a predetermined monitoring item; and a terminal registering unit that, when a determination result of the information analyzer indicates that the terminal device can be monitored, registers the terminal device as a terminal device to be monitored.

6 Claims, 6 Drawing Sheets

(58) Field of Classification Search
CPC ............. H04L 41/5025; H04L 43/0876; H04L 63/1416; H04L 63/20; H04L 67/325; H04L 41/046; H04L 41/12; H04L 41/26; H04L 61/103; H04L 61/6022; H04L 45/70; H04W 24/08
See application file for complete search history.

(56) References Cited

U.S. PATENT DOCUMENTS

| | | | | |
|---|---|---|---|---|
| 2012/0290694 A9* | 11/2012 | Marl | .................. | H04L 12/2807 709/223 |
| 2014/0089492 A1* | 3/2014 | Nelson | .................. | H04L 67/325 709/224 |
| 2014/0370843 A1* | 12/2014 | Cama | .................. | H04W 24/08 455/405 |
| 2015/0020150 A1* | 1/2015 | Hagiuda | .................. | H04L 63/20 726/1 |
| 2015/0326594 A1* | 11/2015 | Chari | .................. | H04L 67/303 726/23 |
| 2015/0358218 A1* | 12/2015 | Nasir | .................. | H04L 41/5025 709/224 |
| 2015/0381430 A1* | 12/2015 | Deguchi | ............. | H04L 43/0876 709/224 |
| 2016/0182538 A1* | 6/2016 | Teddy | ................. | H04L 63/1416 726/23 |
| 2017/0006533 A1* | 1/2017 | Gould | ..................... | H04L 12/28 |
| 2017/0060659 A1* | 3/2017 | Lee | ..................... | G06F 11/0793 |
| 2017/0237608 A1* | 8/2017 | Wu | ..................... | H04L 41/0803 709/220 |

FOREIGN PATENT DOCUMENTS

| | | |
|---|---|---|
| JP | 2015-135547 | 7/2015 |
| JP | 2015-186164 | 10/2015 |

* cited by examiner

FIG. 7A

| Local IP address | 192.168.0.10(Network-A)<br>169.254.0.10(Network-B) |
|---|---|

FIG. 7B

| Effective network device | IP address |
|---|---|
| Network-A | 192.168.0.1<br>192.168.0.2<br>192.168.0.5<br>192.168.0.9<br>192.168.0.10 |
| Network-B | 169.254.0.1<br>169.254.0.2<br>169.254.0.5<br>169.254.0.9<br>169.254.0.10 |

FIG. 7C

| Effective network device | Excluded IP address |
|---|---|
| Network-A | 192.168.0.1<br>192.168.0.10 |
| Network-B | 169.254.0.1<br>169.254.0.10 |

FIG. 8A

| Effective network device | Search target IP address |
|---|---|
| Network-A | 192.168.0.2<br>192.168.0.5<br>192.168.0.9 |
| Network-B | 169.254.0.2<br>169.254.0.5<br>169.254.0.9 |

FIG. 8B

| Effective network device | Search target IP address | Response to Request command |
|---|---|---|
| Network-A | 192.168.0.2<br>192.168.0.5<br>192.168.0.9 | Response received<br>Response received<br>ERROR response |
| Network-B | 169.254.0.2<br>169.254.0.5<br>169.254.0.9 | ERROR response<br>Response received<br>Response received |

FIG. 9

| Registerable IP address | Registered terminal device | Registration target IP address |
|---|---|---|
| 192.168.0.2 | Registered | — |
| 192.168.0.5 | Not registered | O |
| 169.254.0.5 | Not registered | O |
| 169.254.0.9 | Not registered | O |

TERMINAL MONITORING CONTROL DEVICE FOR CONTROLLING AND MONITORING A TERMINAL DEVICE CONNECTED IN A NETWORK

BACKGROUND

1. Technical Field

The present disclosure relates to a terminal monitoring control device which monitors and controls a plurality of terminal devices connected on a network, for example.

2. Description of Related Art

PTL 1 discloses a monitoring server, a network monitoring system, a network monitoring method and a network monitoring program which can automatically monitor information of a monitoring target terminal device. This network monitoring program transmits a specific trap signal when a display terminal device is newly connected to the same network as that of a monitoring server installed on the network. When detecting the trap signal, the monitoring server determines that a new additional registration request for a terminal device has been issued. Consequently, the terminal device can be automatically registered in the monitoring server.

PTL 1: Unexamined Japanese Patent Publication No. 2015-186164

NPL 1: Japan Business Machine and Information System Industries Association, "PJLink Specifications", Version 1.04, pp. 1 to 32, Dec. 10, 2013

SUMMARY

A terminal monitoring control device according to one aspect of the present disclosure is a terminal monitoring control device which controls a terminal device to be monitored connected to a network. The terminal monitoring control device includes a communication information creator, an information analyzer and a terminal registering unit. The communication information creator transmits a first command to the terminal device and receives a response to the first command from the terminal device, and determines whether the terminal device can perform communication based on a received result. The information analyzer transmits a second command to the terminal device and receives a response to the second command from the terminal device when a determination result of the communication information creator indicates that the terminal device can perform communication, and determines based on a received result whether the terminal device can be monitored based on a predetermined monitoring item. The terminal registering unit registers the terminal device as a terminal device to be monitored when a determination result of the information analyzer indicates that the terminal device can be monitored.

The terminal monitoring control device according to the present disclosure does not need to add information such as a trap notification to the terminal device connected on the network, and can specify and register the terminal device to be monitored by using only information of the terminal device which is likely to be a monitoring target and a communication command which is transmitted when information for specifying the terminal device is necessary, based on communication path information stored for each network device.

BRIEF DESCRIPTION OF DRAWINGS

FIG. 7A is a view illustrating a table indicating a local IP address set to each effective network device in terminal monitoring control device 103;

FIG. 7B is a view illustrating a table indicating an IP address of each effective network device set in terminal monitoring control device 103;

FIG. 7C is a view illustrating a table indicating an excluded IP address of each effective network device set in terminal monitoring control device 103;

FIG. 8A is a view illustrating a table indicating a search target IP address of each effective network device;

FIG. 8B is a view illustrating a table indicating a search target IP address and a response to a Request command of each effective network device;

FIG. 9 is a view illustrating a table indicating whether terminal devices of registerable IP addresses are registered and whether the registerable IP addresses are registered IP addresses.

DETAILED DESCRIPTION

An exemplary embodiment will be described below in detail with reference to the drawings as appropriate. However, the exemplary embodiment will not be described more than necessary. For example, matters which have already been well known will not be described in detail, and substantially same components will not be described again in some cases to prevent the following explanation from becoming redundant more than necessary and help one of ordinary skill in the art understand the exemplary embodiment.

In addition, the accompanying drawings and the following description are provided to help one of ordinary skill in the art sufficiently understand the present disclosure yet do not intend to limit a subject matter recited in the claims.

Exemplary Embodiment

The exemplary embodiment will be described below with reference to FIGS. 1 to 10.

1-1. Configuration 1-1-1. Configuration of Terminal Monitoring Control Device

Figure 1:
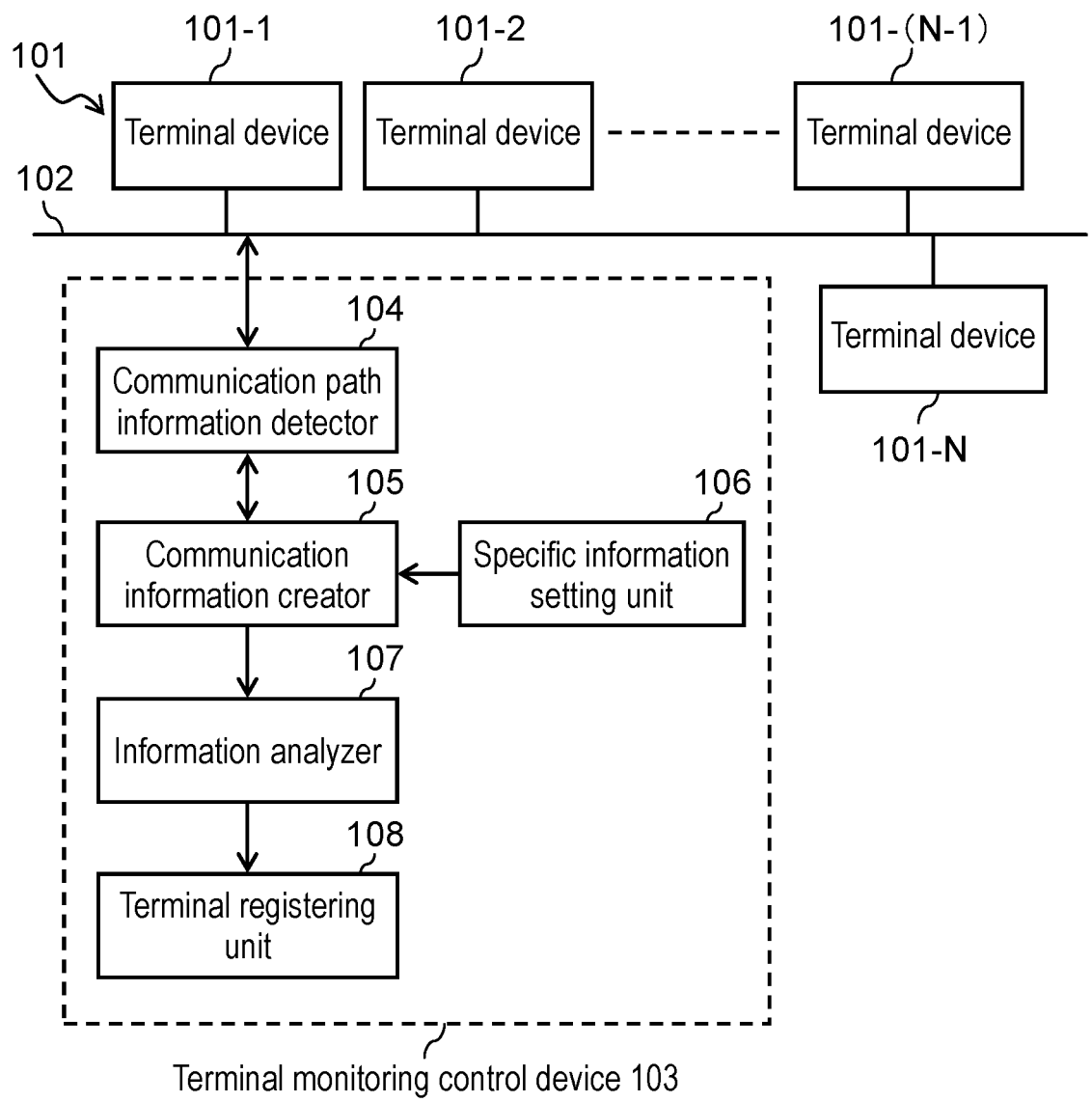
FIG. 1 is a block diagram illustrating a configuration example of a display system including terminal monitoring control device 103 according to an exemplary embodiment.

FIG. 1 is a block diagram illustrating a configuration example of a display system including terminal monitoring control device 103 according to the exemplary embodiment. In FIG. 1, the display system according to the exemplary embodiment employs a configuration where a plurality of N terminal devices 101-1 to 101-N (hereinafter, collectively referred to as terminal devices 101) which are display terminal devices, and terminal monitoring control device 103 are connected to local area network (hereinafter, referred to as a LAN) 102. Herein, LAN 102 is used. However, the present disclosure is not limited thereto, and a predetermined network may be used. Further, each of a plurality of terminal devices 101 includes a display and a communication interface. Each display of a plurality of terminal devices 101 may be arranged in, for example, a matrix format to configure a multi-display device.

As illustrated in FIG. 1, terminal monitoring control device 103 is configured to include communication path information detector 104, communication information creator 105, specific information setting unit 106, information analyzer 107 and terminal registering unit 108.

In FIG. 1, communication path information detector 104 communicates with a plurality of terminal devices 101 via LAN 102, and obtains communication path information stored in terminal monitoring control device 103. Communication information creator 105 creates a communication command for determining whether it is possible to communicate with each terminal device 101 (communication possibility information) based on the communication path information. Specific information setting unit 106 sets a specific command for determining whether it is possible to monitor monitoring items of monitoring target terminal device 101 (monitor possibility information). Information analyzer 107 analyzes information based on reception information obtained from each terminal device 101, and determines whether terminal device 101 can be monitored and has been already registered. Terminal registering unit 108 creates and displays an operation screen based on a determination result when a monitoring target needs to be added, and registers terminal device 101 in terminal monitoring control device 103 by a user's operation. Note that registration unique information (such as an ID and a password) which is necessary for registration may be input in advance. In this case, terminal registering unit 108 determines whether unique information input by the user coincides with the registration unique information, and automatically registers terminal device 101 when it is determined that the coincidence is found. Consequently, it is possible to further realize simplification.

1-1-2. Configuration of Communication Path Information Detector

Figure 2:
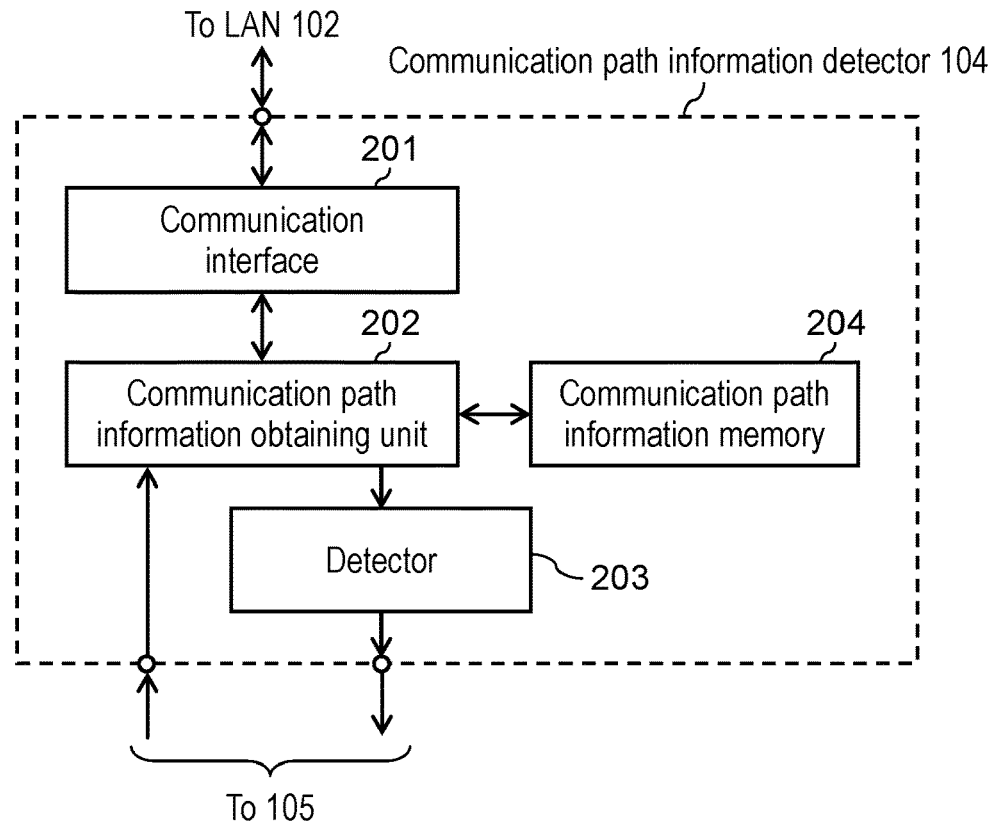
FIG. 2 is a block diagram illustrating a configuration example of communication path information detector 104 in FIG. 1.

FIG. 2 is a block diagram illustrating a configuration example of communication path information detector 104 in FIG. 1. In FIG. 2, communication path information detector 104 includes communication interface 201, communication path information obtaining unit 202 and detector 203. Communication interface 201 can include a plurality of network devices (e.g., communication devices based on TCP/IP) which connects to a plurality of networks on LAN 102.

In FIG. 2, communication interface 201 is connected to LAN 102 to perform communication by transmitting and receiving commands and data to and from a plurality of terminal devices 101 connected to LAN 102. Communication path information obtaining unit 202 is connected to communication interface 201. Communication path information obtaining unit 202 stores a plurality of terminal devices 101 connected to LAN 102 and communication path information of a plurality of terminal devices 101 (an ARP (Address Resolution Protocol) table described in detail below) in communication path information memory 204 for each network device of terminal monitoring control device 103. The communication path information is obtained by performing communication by using an ARP command (third command) according to TCP/IP, for example. Communication path information obtaining unit 202 obtains the communication path information of each network device of terminal monitoring control device 103, from communication path information memory 204. Further, communication path information obtaining unit 202 transmits the communication command created by communication information creator 105 to corresponding terminal device 101 via communication interface 201 and LAN 102. Detector circuit 203 extracts the communication path information obtained by communication path information obtaining unit 202.

Hence, communication path information detector 104 extracts terminal information of monitoring target terminal device 101 based on the communication path information stored in communication path information memory 204, and outputs the terminal information to communication information creator 105.

To extract the communication path information of terminal device 101, communication path information detector 104 transmits, for example, the ARP command (see, for example, RFC (Request For Comments) 826) according to TCP/IP to terminal device 101, and receives a response from terminal device 101. Consequently, it is possible to obtain ARP tables in following tables 1 to 3. Notes 1 to 3 are excluded IP addresses as described below in detail.

(Note 1) Excluded due to a broadcast address in the exemplary embodiment.
(Note 2) Excluded due to a multicast address in the exemplary embodiment.
(Note 3) Excluded due to a gateway address in the exemplary embodiment.

TABLE 1

Interface: 198.245.80.110—0xb

| Internet Address | Physical Address | Type | Note |
|---|---|---|---|
| 198.245.80.19 | 00-08-9b-d3-c7-fb | Dynamic | |
| 198.245.80.109 | e0-cb-4e-26-b4-d1 | Dynamic | |
| 198.245.80.200 | 4c-e6-76-e1-b7-3b | Dynamic | |
| 198.245.80.255 | ff-ff-ff-ff-ff-ff | Static | (Note 1) |
| 224.0.0.22 | 01-00-5e-00-00-16 | Static | (Note 2) |
| 224.0.0.252 | 01-00-5e-00-00-fc | Static | (Note 2) |
| 239.255.255.250 | 01-00-5e-7f-ff-fa | Static | (Note 2) |
| 255.255.255.255 | ff-ff-ff-ff-ff-ff | Static | (Note 1) |

TABLE 2

Interface: 10.73.182.108—0xc

| Internet Address | Physical Address | Type | Note |
|---|---|---|---|
| 10.73.182.1 | 00-00-0c-07-ac-01 | Dynamic | (Note 3) |
| 10.73.182.237 | 74-46-a0-8f-00-68 | Dynamic | |
| 10.73.182.246 | 00-1b-a9-d1-73-f2 | Dynamic | |
| 10.73.182.247 | 48-5b-39-6f-92-db | Dynamic | |
| 10.73.182.248 | 78-e3-b5-94-c2-a0 | Dynamic | |
| 10.73.182.249 | d4-be-d9-97-f8-9c | Dynamic | |
| 10.73.183.11 | 8c-c1-21-51-02-39 | Dynamic | |
| 10.73.183.14 | 50-e5-49-a2-54-35 | Dynamic | |
| 10.73.183.226 | 8c-c1-21-50-d4-20 | Dynamic | |
| 10.73.183.241 | 54-04-a6-4b-80-1a | Dynamic | |
| 10.73.183.255 | ff-ff-ff-ff-ff-ff | Static | (Note 1) |
| 224.0.0.22 | 01-00-5e-00-00-16 | Static | (Note 2) |
| 224.0.0.252 | 01-00-5e-00-00-fc | Static | (Note 2) |
| 239.255.255.250 | 01-00-5e-7f-ff-fa | Static | (Note 2) |
| 255.255.255.255 | ff-ff-ff-ff-ff-ff | Static | (Note 1) |

TABLE 3

| Interface: 192.168.13.11—0x10 | | | |
|---|---|---|---|
| Internet Address | Physical Address | Type | Note |
| 192.168.13.242 | d4-7b-b0-34-6a-a0 | Dynamic | |
| 192.168.13.255 | ff-ff-ff-ff-ff-ff | Static | (Note 1) |
| 224.0.0.22 | 01-00-5e-00-00-16 | Static | (Note 2) |
| 224.0.0.252 | 01-00-5e-00-00-fc | Static | (Note 2) |
| 255.255.255.255 | ff-ff-ff-ff-ff-ff | Static | (Note 1) |

1-1-3. Configuration of Communication Information Creator

Figure 3:
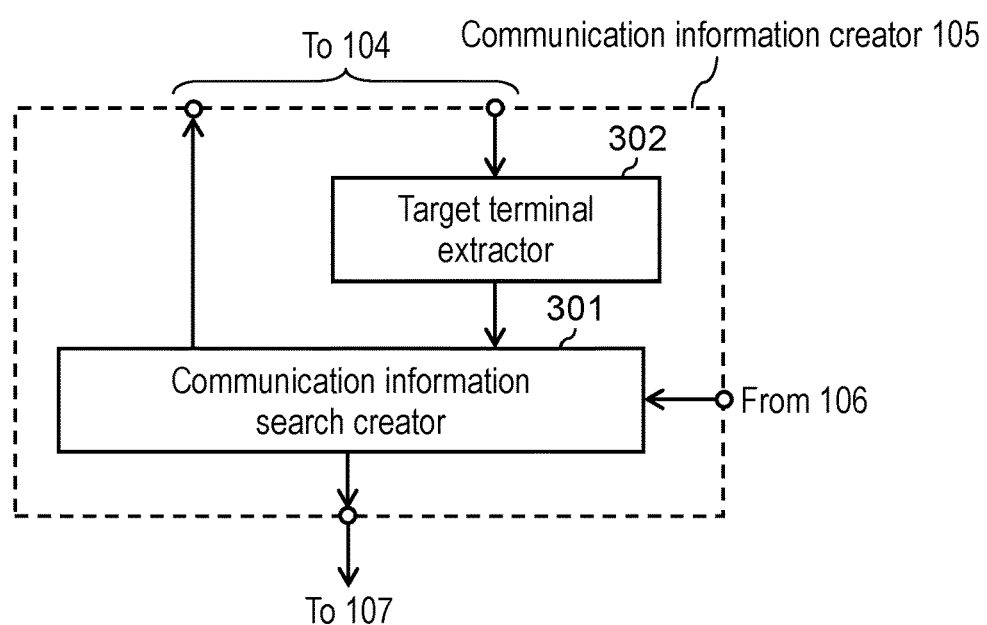
FIG. 3 is a block diagram illustrating a configuration example of communication information creator 105 in FIG. 1.

FIG. 3 is a block diagram illustrating a configuration example of communication information creator 105 in FIG. 1. In FIG. 3, communication information creator 105 is configured to include communication information search creator 301 and target terminal extractor 302.

In FIG. 3, target terminal extractor 302 extracts terminal information of terminal device 101 (such as an IP address and physical address (MAC address) information) based on the communication path information extracted by detector 203. Further, target terminal extractor 302 extracts received contents of the specific command described below from terminal device 101, and outputs the received contents to communication information search creator 301. Communication information search creator 301 creates a communication command (first command) for obtaining detail information of terminal device 101 based on specific command information set by specific information setting unit 106 and the communication path information extracted by target terminal extractor 302. Communication information search creator 301 outputs the created communication command to communication path information detector 104, receives received information of the specific command information of terminal device 101 from target terminal extractor 302, and outputs the received information to information analyzer 107.

Hence, communication information creator 105 can create and transmit a communication command for determining monitoring target terminal device 101 based on the above communication path information obtained in advance, and can extract a reception result of the communication command received from each terminal device 101 in response to the communication command.

Further, communication information creator 105 determines whether terminal device 101 includes an exclusion target IP address, based on obtained communication possibility information of terminal device 101. When terminal device 101 is a terminal device which does not include the exclusion target IP address, it is determined that terminal device 101 can perform communication. When terminal device 101 is a terminal device which includes the exclusion target IP address, it is determined that terminal device 101 cannot perform communication.

Whether terminal device 101 can perform communication and can be monitored (communication possibility information) can be determined by using, for example, a following specific command unique to the applicant (e.g., a serial command according to RS-232C standards). A command format is illustrated in table 4, and a command example is illustrated in table 5.

TABLE 4

(Command Format)

[STX] C1 C2 C3: p1p2p3 ... pn (indefinite length) [ETX]

(Note)
':' subsequent parameters are added when necessary.

TABLE 5

(Command Example)

<Obtain Information>
Position Information Inquiry (Request):
[STX]QPS [ETX]
Position Information Response (Reply):
[STX] QPS=11 [ETX]
<Set Information>
Position Information Setting (Request):
[STX]OPS:11 [ETX]
Position Information Setting Response (Reply) (Note) Call Back:
[STX]OPS:11 [ETX]

1-1-4. Configuration of Specific Information Setting Unit

Figure 4:
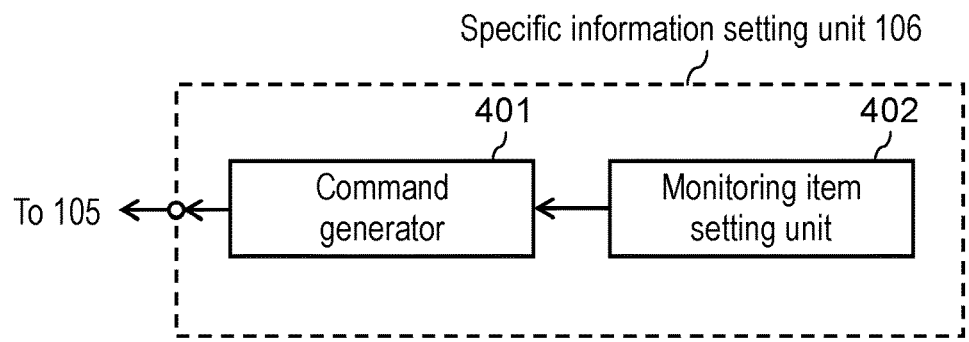
FIG. 4 is a block diagram illustrating a configuration example of specific information setting unit 106 in FIG. 1.

FIG. 4 is a block diagram illustrating a configuration example of specific information setting unit 106 in FIG. 1. In FIG. 4, specific information setting unit 106 is configured to include command generator 401 and monitoring item setting unit 402.

In FIG. 4, monitoring item setting unit 402 sets monitoring items (temperature information and use time information) of monitoring target terminal device 101 which can be monitored in advance by a user's operation input or an input from an external device via a predetermined interface. Command generator 401 creates a specific command (second command) corresponding to an item set by monitoring item setting unit 402), and outputs the specific command to communication information search creator 301. Hence, by creating a command which is necessary for specific information setting unit 106 to perform monitoring, it is possible to filter terminal device 101 to monitor, and register only terminal device 101 which can be monitored.

The monitoring items of terminal device 101 can be inquired by using a command according to, for example, PJLink commands (see, for example, NPL 1). Hereinafter, a command format is illustrated in table 6, and a command example is illustrated in table 7.

TABLE 6

(Command Format (Transmission))

Header + Class Command Separator (Space) Transmission Parameter End (CR)

(Command Response (Response))

Header + Class Command Separator (=) Transmission Parameter End (CR)

TABLE 7

(Command Example)

Information Inquiry
%1INFO(SP)?(CR)
Information Response
%1INFO = (Response Data (Note))(CR)
(Note) Arbitrary character string is stored
In case of error
%1INFO=ERR1(CR)

1-1-5. Configuration of Information Analyzer

Figure 5:
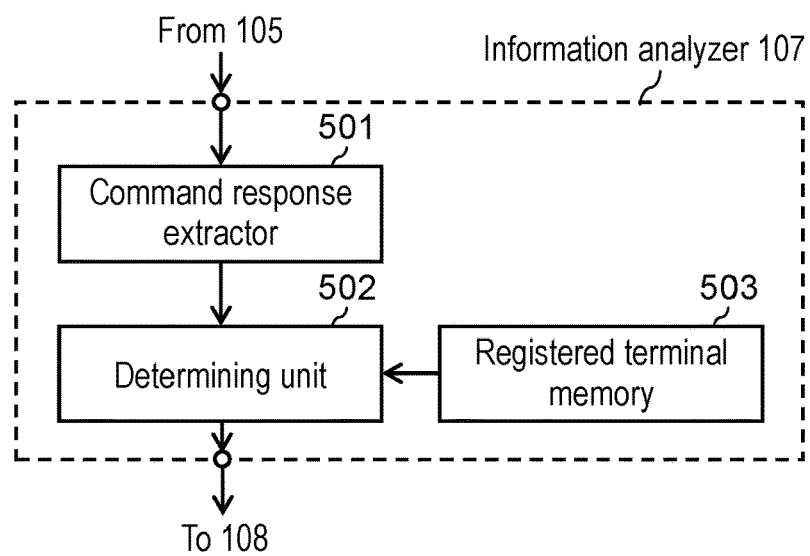
FIG. 5 is a block diagram illustrating a configuration example of information analyzer 107 in FIG. 1.

FIG. 5 is a block diagram illustrating a configuration example of information analyzer 107 in FIG. 1. In FIG. 5, information analyzer 107 is configured to include command response extractor 501, determining unit 502 and registered terminal memory 503.

In FIG. 5, command response extractor 501 receives and extracts a response result from terminal device 101 in response to a communication command created by communication information creator 105. Determining unit 502 is connected to command response extractor 501. Determining unit 502 compares information of the response result extracted by command response extractor 501, and registered terminal information stored in registered terminal memory 503 when it is determined that a command response is a predetermined response. When it is determined that response information is a response from terminal device 101 which is not registered, determining unit 502 determines that terminal device 101 can be monitored, and outputs the response information to terminal registering unit 108 when this terminal device 101 is terminal device 101 which is not registered.

1-1-6. Configuration of Terminal Registering Unit

Figure 6:
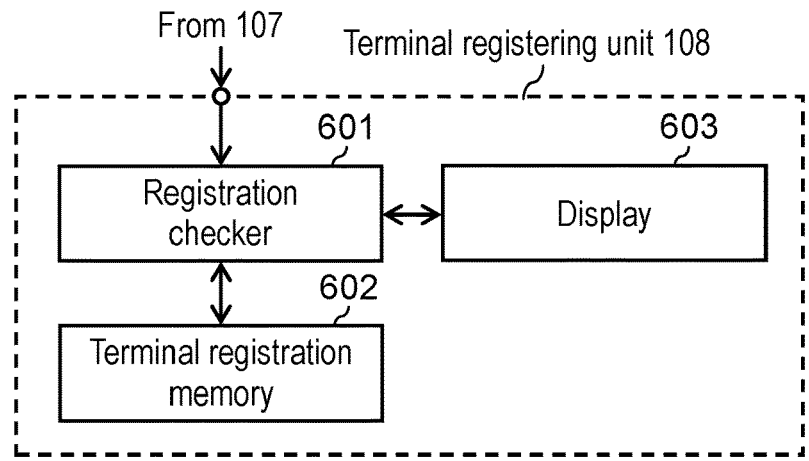
FIG. 6 is a block diagram illustrating a configuration example of terminal registering unit 108 in FIG. 1.

FIG. 6 is a block diagram illustrating a configuration example of terminal registering unit 108 in FIG. 1. In FIG. 6, terminal registering unit 108 is configured to include registration checker 601, terminal registration memory 602 and display 603.

In FIG. 6, when it is determined that terminal information is not registered based on an analysis result of information analyzer 107, registration checker 601 displays on display 603 a check screen indicating whether to register monitoring target terminal device 101. When a user's operation permits registration of predetermined terminal device 101 as a monitoring target, registration checker 601 stores and registers information of this terminal device 101 in terminal registration memory 602. Note that registration unique information (such as an ID and a password) may be set in advance to terminal information of terminal device 101. In this case, registration checker 601 determines whether the unique information input by the user coincides with the registration unique information, and automatically registers terminal device 101 in terminal registration memory 602 when it is determined that the coincidence is found. Thus, it is not necessary to obtain a check permission, and simplification can be further realized.

1-2. Operation

An operation of terminal monitoring control device 103 configured as described above will be described with reference to FIGS. 7A to 10.

1-2-1. Obtaining of Communication Path Information

FIGS. 7A to 7C are tables for explaining an operation of communication path information obtaining unit 202 in FIG. 2. Here, FIG. 7A is a view illustrating the table indicating a local IP address set to each effective network device (network name) in terminal monitoring control device 103. Further, FIG. 7B is a view illustrating the table indicating an IP address of each effective network device (network name) set in terminal monitoring control device 103. Furthermore, FIG. 7C is a view illustrating the table indicating an excluded IP address of each effective network device (network name) set in terminal monitoring control device 103.

FIGS. 7A to 7C illustrate operation examples in which two effective network devices (Network-A and Network-B) and a plurality of terminal devices 101 connected to LAN 102 are present.

In FIG. 7A, a local IP address shown below is set to the effective network device of terminal monitoring control device 103.

(1) IP address "192.168.0.10" is set to Network-A; and
(2) IP address "169.254.0.10" is set to Network-B.

FIG. 7B illustrates a following example of an address information table stored when communication is performed by using the effective network device.

(1) "192.168.0.1", "192.168.0.2", "192.168.0.5", "192.168.0.9" and "192.168.0.10" are indicated as address information (IP addresses) used to communicate with the network device (Network-A).

(2) "169.254.0.1", "169.254.0.2", "169.254.0.5", "169.254.0.9" and "169.254.0.10" are indicated as address information (IP addresses) used to perform communication with the network device (Network-B).

Communication path information obtaining unit 202 in FIG. 2 obtains communication path information of the address information table stored for each effective network device by, for example, transmitting an ARP command to LAN 102. Detector 203 detects information which is likely to indicate monitoring target terminal device 101 from the obtained communication path information of the address information table. That is, detector 203 detects exclusion target address such as an IP address or a special IP address illustrated in FIG. 7C from the communication path information obtained from the address information table. In FIG. 7C, the network device (Network-A) detects "192.168.0.1" and "192.168.0.10" as excluded IP addresses. Similarly, the network device (Network-B) detects "169.254.0.1" and "169.254.0.10" as excluded IP addresses. Target terminal extractor 302 extracts the rest of IP addresses of the address information table as IP addresses which can be monitored.

1-2-2. Search of Monitoring Target Display Terminal Device

FIG. 8A is a table for explaining an operation of communication information creator 105 in FIG. 3, and is a table indicating a search target IP address of each effective network device. Further, FIG. 8B is a table for explaining an operation of information analyzer 107 in FIG. 5, and is a table indicating a search target IP address of each effective network device and a response to a Request command. An operation related to creation of a command and a reception result of terminal device 101 of the IP address extracted by communication information creator 105 will be described with reference to FIGS. 8A and 8B.

FIG. 8A illustrates the search target IP addresses of the effective network devices extracted by target terminal extractor 302. Communication information search creator 301 transmits the communication command including the specific command set by specific information setting unit 106, to terminal device 101 via communication path information detector 104 and LAN 102.

Command response extractor 501 of information analyzer 107 receives a response to the transmitted communication command from terminal device 101 via LAN 102, communication path information detector 104 and communication information creator 105. In this case, command response extractor 501 searches for a Request command response as illustrated in FIG. 8B. In an operation example in FIG. 8B, as a response to each terminal device 101 of the network device (Network-A), "Response received" is detected from terminal devices 101 of IP addresses "192.168.0.2" and "192.168.0.5", and "ERROR response" is detected from terminal device 101 of IP address "192.168.0.9". Further, similarly in FIG. 8B, as a response to each terminal device 101 of the network device (Network-B), "Response received" is detected from terminal devices 101 of IP addresses "169.254.0.5" and "169.254.0.9", and "ERROR response" is detected from terminal device 101 of IP address "169.254.0.2".

As a result, command response extractor 501 outputs address information (IP address) indicating that (A) the IP addresses of terminal devices 101 which the network device (Network-A) can communicate with are "192.168.0.2" and "192.168.0.5", and (B) the IP addresses of terminal devices 101 which the network device (Network-B) can communicate with are "169.254.0.5" and "169.254.0.9".

1-2-3. Check of Registration of Monitoring Target Terminal Device

FIG. 9 is a table for explaining an operation of terminal registering unit 108 in FIG. 6, and is a view illustrating the table indicating whether terminal devices of registerable IP addresses are registered and whether the registerable IP addresses are registered IP addresses.

For the IP address extracted by command response extractor 501 in FIG. 5, registered terminal memory 503 extracts an IP address of terminal device 101 which has already been registered as a monitoring target. In FIG. 9, when information indicating only registered "192.168.0.2" is obtained as the IP address of registered terminal device 101, determining unit 502 outputs the rest of IP addresses "192.168.0.5", "169.254.0.5" and "169.254.0.9" as registerable registration target IP addresses to terminal registering unit 108.

1-2-4. Registration of Monitoring Target Terminal Device

Figure 10:
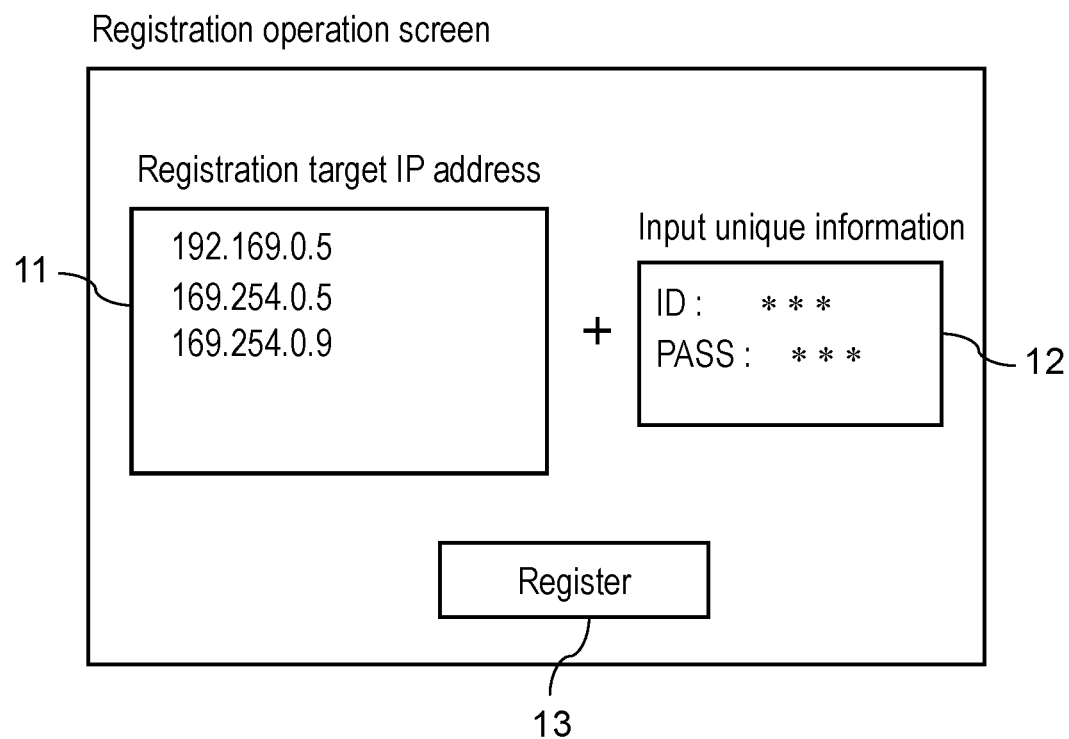
FIG. 10 is a front view illustrating an example of a registration operation screen displayed on display 603 by terminal registering unit 108 in FIG. 6.

FIG. 10 is a front view illustrating an example of a registration operation screen displayed on display 603 by terminal registering unit 108 in FIG. 6.

As illustrated in FIG. 10, registration target IP address 11 which can be registered by registration checker 601 is displayed on display 603 of a user interface based on a determination result of determining unit 502 in FIG. 5. The user selects address information to register, and pushes registration button 13. Then, terminal registration memory 602 registers terminal device 101 as a monitoring target in a database.

By setting setting information of unique information input 12 as registration conditions in advance (designating, for example, ID information and a password (PASS) in FIG. 10), it is also possible to automatically register only terminal device 101 which coincides with the above conditions.

1-3. Summary of Configuration and Operation

Terminal monitoring control device 103 configured as described above is configured as follows to operate.

(A) Terminal monitoring control device 103 monitors and controls a plurality of terminal devices 101 connected to LAN 102.

(B) Communication path information detector 104 transmits to the plurality of terminal devices 101, for example, an ARP command for obtaining communication path information of the plurality of terminal devices 101, and then receives the communication path information which is response information of the ARP command from the plurality of terminal devices 101 to obtain the communication path information of the plurality of terminal devices 101.

(C) Communication information creator 105 transmits to terminal device 101 a communication command for determining whether at least one terminal device 101 whose communication path information has been obtained can perform communication, and then receives the response information of the communication command from terminal device 101 to obtain the communication possibility information of terminal device 101.

(D) Information analyzer 107 designates predetermined monitoring items of terminal device 101 when terminal device 101 can perform communication, transmits to terminal device 101 a search command for determining whether terminal device 101 can be monitored, and then receives the response information of the search command from terminal device 101 to obtain monitoring possibility information of terminal device 101.

(E) Terminal registering unit 108 registers terminal device 101 as monitoring target terminal device 101 when terminal device 101 can be monitored based on the monitoring items.

1-4. Effects and the Like

As described above, when the display system which monitors and controls a plurality of terminal devices 101 connected to LAN 102 is constructed, the terminal monitoring control device according to the present exemplary embodiment does not need to register information of monitoring target terminal device 101 in advance in the database and implement a special command (trap notification) for automatic registration of information in terminal device 101, and can search for monitoring target terminal device 101 by using path information which can be extracted from a normal network connection state. Consequently, it is possible to reduce a communication load produced when a search dedicated command is transmitted, and reduce steps for registration.

The "trap notification" is a notification for monitoring an information communication system. When an abnormality occurs in a terminal device which is monitored or the terminal device is in a state which is not an originally set appropriate state, the terminal device automatically transmits the trap notification.

Further, in the present exemplary embodiment, by registering the registration conditions in advance in the user interface, the terminal monitoring control device can automatically register a terminal device when the terminal device coincides with the registration conditions. Consequently, it is possible to automatically register terminal device 101 without checking registration of terminal device 101 by connecting terminal device 101 on the same network.

Other Exemplary Embodiments

As described above, an exemplary embodiment is described as examples of the technique disclosed in the present application. However, the technique in the present disclosure is not limited thereto, and can also be applied to embodiments in which change, substitution, addition, omission and the like are performed. A new exemplary embodiment can also be made by a combination of the components described in the exemplary embodiment.

Accordingly, another exemplary embodiment will be described below.

An example where a plurality of terminal devices 101 is connected on a network has been described in the above exemplary embodiment. However, the present disclosure is not limited thereto, and instead of terminal device 101, all terminal devices such as monitoring cameras, other terminal monitoring control devices and personal computers which can be connected to the network may be used. In such a case, a predetermined communication system is used instead of a display system in FIG. 1. Further, an example of a plurality of N terminal devices 101 has been described. However, a number of terminal devices 101 may be at least one. At least one terminal device 101 may be capable of communicating with communication path information detector 104 via LAN 102.

In the exemplary embodiment, communication path information detector 104 transmits to a plurality of terminal devices, for example, an ARP command for obtaining communication path information of the plurality of terminal devices 101, and then receives the communication path information which is response information of the ARP command from the plurality of terminal devices to obtain the communication path information of the plurality of terminal devices. However, the present disclosure is not limited thereto, and communication path information may be detected in advance by communication path information detector 104 and stored.

Since the above described exemplary embodiment is for exemplifying the technique of the present disclosure, various modifications, replacements, additions, and omissions can be made within the scope of the appended claims or of their equivalents.

The present disclosure is applicable to a terminal monitoring control device which constructs a system which monitors and controls a plurality of terminal devices such as a display terminal device connected on a network.

What is claimed is:

1. A terminal monitoring control device that controls a terminal device to be monitored and that is connected to a network, the terminal monitoring control device comprising:
   a detector that acquires communication path information by transmitting a third command to the terminal device and receiving a response to the third command from the terminal device;
   a memory that stores the communication path information according to each of network devices of the terminal monitoring control device;
   a communication information creator that transmits a first command to the terminal device and receives a response to the first command from the terminal device using the communication path information, and determines whether the terminal device is to perform communication based on a received result;
   an information analyzer that, when a determination result of the communication information creator indicates that the terminal device is to perform communication, transmits a second command to the terminal device and receives a response to the second command from the terminal device using the communication path information, and determines based on a received result whether the terminal device is to be monitored based on a predetermined monitoring item; and
   a terminal registering unit that, when a determination result of the information analyzer indicates that the terminal device is to be monitored, registers the terminal device as a terminal device to be monitored.

2. The terminal monitoring control device according to claim 1, wherein the communication information creator determines whether the terminal device includes an exclusion target address, based on obtained communication possibility information of the terminal device, and when the terminal device is a terminal device including the exclusion target address, sets the terminal device as a terminal device that cannot perform communication.

3. The terminal monitoring control device according to claim 1, further comprising an information setting unit that sets a monitoring item of the terminal device.

4. The terminal monitoring control device according to claim 1, wherein the information analyzer determines whether the terminal device is not registered based on predetermined registration terminal device information when the terminal device can be monitored based on the monitoring item, and when the terminal device is not registered, causes the terminal registering unit to register the terminal device as a terminal device to be monitored.

5. The terminal monitoring control device according to claim 1, wherein the terminal registering unit determines whether registration unique information to be input coincides with predetermined unique information, and when the registration unique information coincides with the predetermined unique information, the terminal device is registered as a terminal device to be monitored.

6. The terminal monitoring control device according to claim 1, wherein the communication path information is an ARP table including an IP address and a MAC address.

* * * * *